United States Patent [19]
Callins et al.

[11] 3,842,325
[45] Oct. 15, 1974

[54] FUSED CATHODE ELECTROLYTIC CAPACITORS

[75] Inventors: Harold T. Callins; William H. Doster, both of Greenfield, Tenn.

[73] Assignee: Whitehall Electronics Corporation, Richardson, Tex.

[22] Filed: Sept. 17, 1973

[21] Appl. No.: 397,627

Related U.S. Application Data

[62] Division of Ser. No. 259,920, June 5, 1972, Pat. No. 3,789,502.

[52] U.S. Cl............... 317/230, 29/570, 317/230, 317/242
[51] Int. Cl............................................. H01g 9/00
[58] Field of Search ............ 317/230, 242; 29/570

[56] References Cited
UNITED STATES PATENTS
2,932,153   4/1960   Bernard et al..................... 317/230
3,346,781  10/1967   Moresi et al...................... 317/230
3,518,500   6/1970   Jimerson.......................... 317/230

*Primary Examiner*—Andrew J. James
*Attorney, Agent, or Firm*—Mason, Fenwick & Lawrence

[57] ABSTRACT

A metallic foil electrolytic capacitor wherein anode and cathode foils and dielectric sheets are wound into a capacitor cartridge or roll with a lateral edge of the cathode foil protruding in exposed relation at the bottom of the roll beyond the edges of the dielectric sheets and anode foil insulated therebetween, and the protruding exposed cathode foil edges are thermally fused together in a selected pattern spanning the bottom of the roll.

4 Claims, 4 Drawing Figures

PATENTED OCT 15 1974　3,842,325

FUSED CATHODE ELECTROLYTIC CAPACITORS

This is a division of application Ser. No. 259,920 filed June 5, 1972, now U.S. Pat. No. 3,789,502.

BACKGROUND AND OBJECTS OF THE INVENTION

The present invention relates in general to electrolytic capacitors wherein the capacitor cartridge is of wound metallic foil and dielectric sheet material, and more particularly to electrolytic capacitors having a cartridge formed of anode and cathode metallic foil layers and dielectric sheets such as paper wound into a capacitor roll, wherein exposed edges of the foil forming the cathode are thermally fused together along selected paths after the capacitor roll is formed to effect localized melting of the cathode material and thereby reduce ohmic resistance and inductive effects of the cathode circuit.

Aluminum foil electrolytic capacitors of the polar style construction exhibit internal power losses due to inductive and capacitive reactance effects when operated in AC circuit applications. More specifically, such electrolytic capacitors exhibit internal power losses when the applied AC frequency is increased or the operating temperature is decreased. The losses effected by an increase in the applied AC frequency are caused by the resulting decrease in effective series capacitance as well as inductance effects at higher frequencies and an increase in the Equivalent Series Resistance, frequently known by the abbreviated term "ESR." The losses increase with extended age or use of the capacitor. The increase in equivalent series resistance and in the capacitive and inductive effects is a major factor in operational heating of such capacitors under AC operational conditions.

The loss of capacitance and increase in equivalent series resistance cause a related increase in the impedance of the device. The impedance is defined in terms of effective series capacitance and Equivalent Series Resistance in the equation:

$$Z = \sqrt{X_c^2 + R^2}$$

Where:
$Z$ = Impedance in Ohms
$X_c = 1/2 \pi f c$ = 6.28 × Applied Frequency in Hz × Effective Series Capacitance in Farads Divided Into 1.0

$R$ / Equivalent Series Resistance in Ohms

Other considerations influencing the impedance characteristics of an electrolytic capacitor include: (1) anode foil anodization voltage, (2) anodic foil capacitance per square inch, (3) electrolytic composition, (4) paper composition and fibre type and (5) anode foil capacitance ratio.

Heretofore, it has been a common practice in the capacitor industry to mechanically swage cathodes to reduce the cathode ohmic resistance and reduce inductive effects of the capacitor winding. The mechanical swage method customarily involves subjecting the protruding edges of the cathode metallic foil forming the capacitor roll or cartridge to a stroking action by a rigid bar, a thin hardened narrow wheel, a toothed plate, or the like, to mechanically pinch or channel and press the adjacent turns of exposed cathode foil together by movement of the swaging tool across the base of the exposed cathode section, thus producing only mechanical contact between the swaged portions of the adjacent convoluted turns of the cathode foil. However, certain difficulties arise from use of this mechanical swage method. The cathode foil of a metal oxide electrolytic capacitor generally has a very low voltage or natural oxide film coating the negative foil plate. This thin film provides very high capacitance per square inch compared to the anodized anode foil. The major problem with the mechanical swage method lies in the ability of the cathode to form an anodic coating. The mechanical swage construction depends on purely mechanical contact points or pressure which can "open" or become high ohmic resistance junctions over a long period of time due to an oxide film build-up at the contact pressure points, increasing the internal capacitor electrical losses. The anodization under small reverse potentials or extended use which occurs on the cathode electrode and the overlapping contact pressure points produced during mechanical swaging increases the Equivalent Series Resistance due to an increase in the ohmic resistance arising from the oxide coating at the pressure points.

An object of the present invention is the provision of a novel electrolytic capacitor construction, especially useful for electrolytic capacitors of the aluminum foil type, wherein the exposed cathode foil edges of the capacitor roll or cartridge are thermally fused to effect localized melting of the cathode material across single or multiple fused paths to thereby reduce ohmic resistance and inductive effects. The use of the fused cathode construction deletes the requirement for the placement of several ribbon tab or foil connections to be welded or stitched along the cathode foil. The deletion of the need for several tabs or foil connections decreases the probability of chemical action causing internal corrosion due to electro-mechanical connections of metals of different purity levels, forming a series resistive circuit when an electromotive force is applied between the cathode plate and the anode plate.

Another object of the present invention is the provision of a novel electrolytic capacitor construction, achieving a permanent reduction in the electrical losses and an increase in the efficiency of the device, by thermally fusing adjacent convoluted turns of the capacitor cartridge to provide a base metal connection between the spiralled turns of the completed cartridge. The fused layer of localized molten base metal is utilized after cooling to provide a permanent electromechanical bonding of low ohmic resistance between convoluted turns of the exposed cathode surface to permit reduced electrical losses in polar electrolytic capacitors.

Other objects advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
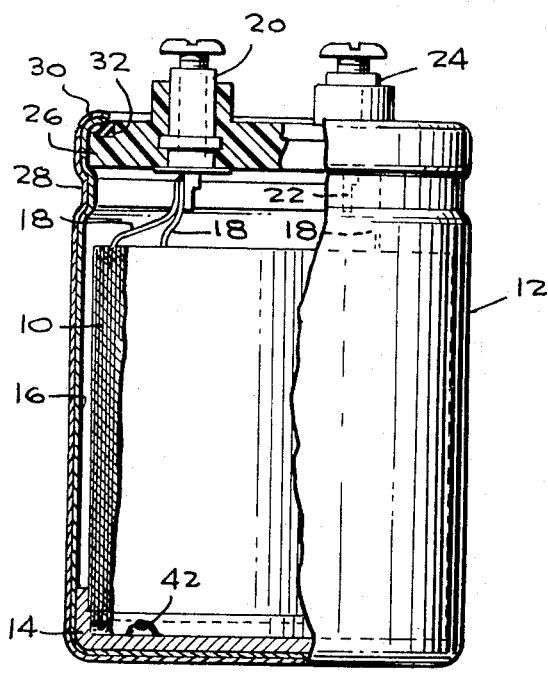
FIG. 1 is an elevation view, with the left hand half shown in section, of a fused cathode electrolytic capacitor constructed in accordance with the present invention.

Referring to the drawings, wherein like reference characters designate corresponding parts throughout the present invention, electrolytic capacitors of the present invention are formed in a manner such that the adjacent convoluted turns of the extended cathode foil edges are thermally fused in a manner to reduce ohmic resistance and inductive effects of the cathode foil circuit. The completed electrolytic capacitor construction is of the type illustrated in FIG. 1, wherein the capacitor cartridge or roll 10 is formed of a wrapped pair of strips of metallic foil forming an anode foil and a cathode foil, together with layers of paper or other dielectric sheet material. The capacitor cartridge or roll 10 is of generally cylindrical configuration and is housed within a metal container, usually in the form of an aluminum case or can 12; the cartridge 10 being held in position by a conventional anchoring compound 14 encasing the lower end portion of the capacitor cartridge 10 and anchoring the same against the insulating sleeve 16 covering the inner surface of the bottom and side walls of the metallic case 12. Metallic terminal tabs 18 fastened in suitable manner to the anode foil extend from between intermediate convolutions of the cartridge to the threaded anode terminal 20, while a similar terminal tab 22 extends from the end of the cathode foil to the threaded cathode terminal 24. The anode terminal 20 and cathode terminal 24 are mounted in conventional fashion in the molded top seal 26 forming the top closure of the electrolytic capacitor, which in accordance with the conventional practice is held in position by mechanically swaging the side wall of the case 12 inwardly to form a shoulder, as indicated at 28, locating the lower surface of the molded top seal 26, while the upper portion of the side wall of the case 12 is rolled over as indicated at 30 over the seal gasket 32 in a recess at the upper perimeter of the molded top seal 26.

The capacitor cartridge or roll 10 is formed by superposing in a layered or sandwich arrangement strips or webs of paper 34 and 36 of similar width, with the anode foil strip 38 having a width somewhat less than the width of the paper webs. overlying the uppermost paper web 36 with its lateral edges disposed inwardly from the lateral edges of the paper web 36, and with the cathode foil, for example a strip of aluminum foil, indicated at 40 having a width equal to or slightly greater than the width of the paper webs so that the lower edge 40a extends below the adjacent edges of the paper webs 34 and 36 to form protruding cathode foil edges 40a at the bottom of the capacitor roll 10.

The electrolytic capacitor construction utilizes high purity aluminum anode and cathode element foils 38 and 40 to assure minimum gassing during the useful life of the capacitor, and the electrical connection from the anode and cathode terminals 20 and 24 through the tabs 18 and 22 to the foils is made by mechanically stitching high purity aluminum ribbons forming the tabs 18 and 22 to the foils 38 and 40. The mechanical stitching may be accomplished, for example, by forcing small tabs or portions of the ribbon material through the foil material and bending them tightly against the opposite side of the foil to mechanically clamp each of the foils to their respective ribbon tabs 18 and 22. The aluminum ribbons forming the tabs 18 and 22 are securely welded to the axial lead wire terminals 20 and 24, which may include a case connection to the cathode element or to the internal seal assembly terminal posts in the case of single-ended units to assure a reliable electro-mechanical bonding. Absorbent paper tissue is utilized for the paper webs 34 and 36 to mechanically separate the foils 38 and 40 and provide an electrolyte reservoir. The foil and paper layers 34, 36, 38 and 40 are wound convolutely and taped to form the cartridge 10, and the cartridge is then impregnated with the electrolyte and mechanically anchored to the base of the case with the plastic anchoring compound 14.

While it has been previously known in the capacitor industry to mechanically swage the adjacent convoluted turns of the cathode foil edges into mechanical contact with each other by a stroking action of a ridged bar or wheel to mechanically pinch the exposed cathode foil turns together by movement of the swaging tool, this mechanical swaging method has produced a number of problems as previously discussed, particularly because of the anodization which occurs on cathode electrode and the overlapping pressure contact points which increases the equivalency series resistance because of the oxide coating which forms at the pressure points.

Figure 4:
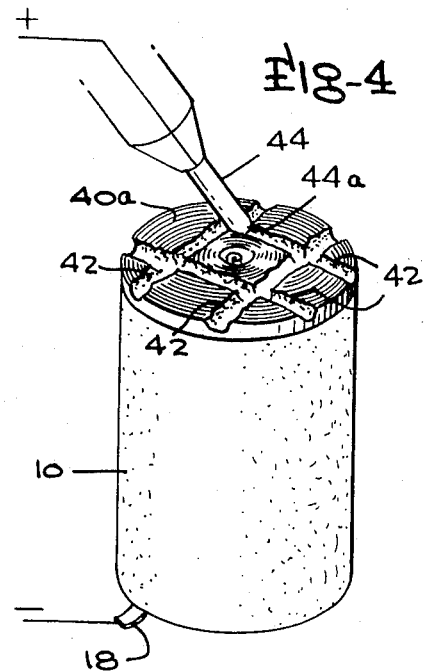
FIG. 4 is a perspective view of the capacitor cartridge or roll in inverted position, showing the thermally fused pattern along the exposed cathode edges, formed in accordance with the present invention.
Figure 2:
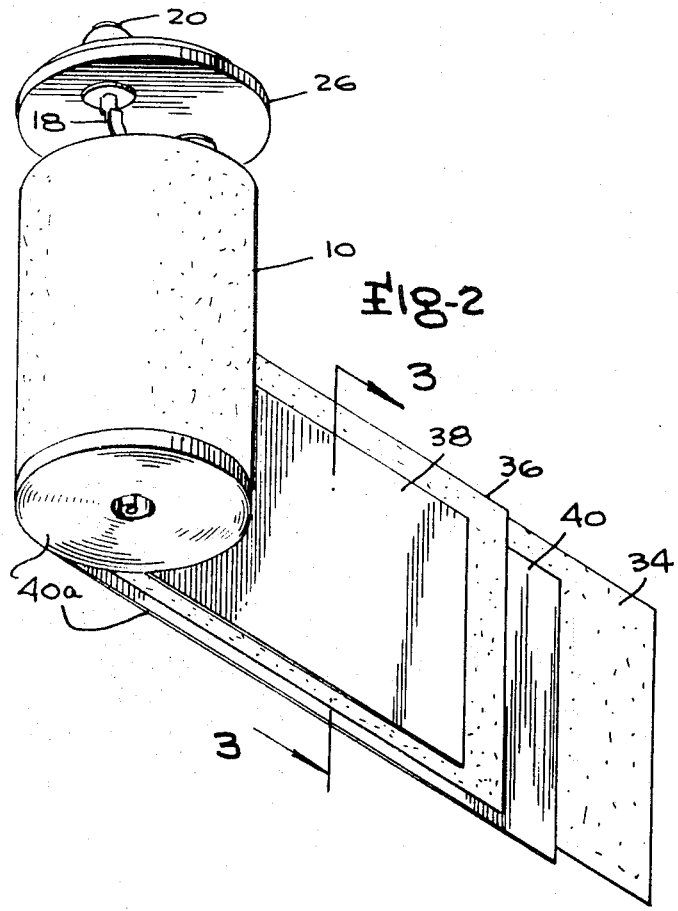
FIG. 2 is a perspective view of the capacitor roll or cartridge in partially unwrapped condition, shown withdrawn from the usual aluminum case.
Figure 3:
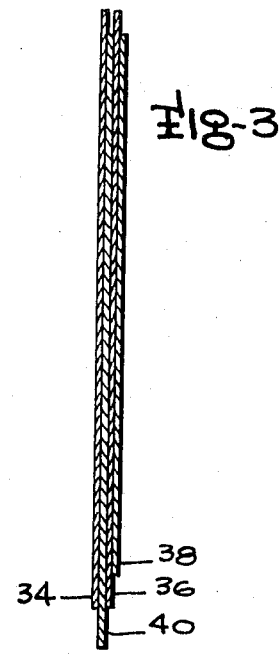
FIG. 3 is a section view through a portion of the unwrapped layers, taken along the line 3—3 of FIG. 2.

In accordance with the present invention, when the capacitor cartridge or roll 10 has been formed from the layers of paper 34 and 36 and foil 38 and 40, the protruding edges 40a of the cathode foil 40 are then thermally fused to affect a permanent reduction in the Equivalent Series Resistances and the inductive reactance effects. One method of accomplishing this cathode fusing of the lower cathode foil edges is to electrically fuse the foil layers in a pattern, such as a crisscross or cross hatch pattern as indicated at 42 in FIG. 4, by generating heat in excess of the cathode melting temperature by a resistance-welding type circuit. By this method, an approximately 12 volt DC potential, for example, is applied between the cathode foil and an electrode, by making contact to the negative tab 22 of the capacitor cartridge 10 and an electrode 44 having, for example, a conical pointed end. The circuit is completed when the conical pointed end of the electrode 44 is drawn across the exposed cathode protruding foil edges 40a. The heated contact areas of the electrode conical tip 44a and the contact points of the cathode foil provide a high current path between the foil turns. The result is a thermal fusing of the exposed cathode edges 40a by localized melting of the cathode material. The local surface area of the exposed cathode edges 40a after being fused are metallurgically, mechanically and electrically connected. All adjacent foil edges 40a in the local path of the electrode 44 and the cathode foil contact area are effectively fused together. Single or multiple fused paths 42 may be utilized. In one practical embodiment, a high purity carbon, conically pointed rod electrode 44 has been used to form the fused paths 42 across the bottom of the capacitor cartridge.

Alternatively, the thermal fusing of the protruding cathode foil edges 40a may be accomplished by the use of a fusing die which has been heated above the melting temperature of the cathode foil material. The heated die, when placed across the exposed protruding cathode foil surfaces 40a for several seconds, under several pounds of pressure, locally fuses the adjacent exposed cathode foil edge material in much the same manner as the electrical fusing method. The heated die may have the criss-cross configuration desired so that in a single stroke, the several fused paths 42 forming a first parallel set of paths or strokes and a second parallel set of paths or strokes perpendicular to the first may be formed in one operation of the fusing die.

The fused paths 42 along the protruding edges 40a of the cathode foil material provide short parallel paths interfacing with the anode foil. These parallel paths considerably reduce the ohmic resistance and inductance of the cathode foil compared with a single or multiple tab cathode type connection which is typically used in the electrolytic capacitor industry.

Not only does the thermally fused paths 42 of cathode foil contact points prevent the development of high ohmic resistance junctions over a period of time due to oxide film build-up such as occurs in the mechanically swaged construction, thus providing permanently reduced ohmic resistance, and low impedance and low electrical power loss characteristics, but the arrangement also obviates the need to provide a number of ribbon tab or foil connections which must be welded or stitched along the cathode foil, in addition to the usual anode and cathode terminal tabs 18 and 22, and thus avoiding the problems inherent in such a prior art type construction.

What is claimed is:

1. An electrolytic capacitor comprising a capacitor cartridge in the form of a roll comprising a spirally wound set of layers of elongated alternately superposed metallic foil and dielectric strips, the metallic foil strips forming an anode foil of narrower width than the dielectric strips in insulated relation therebetween and a cathode foil positioned with one of its edges protruding in exposed relation beyond the corresponding edges of the dielectric sheets at one end of the roll, and said end of the roll having a pattern of rectilinear narrow width, elongated trough depressions therein formed in the protruding cathode foil edges of adjacent convoluted turns completly spanning said end along trough axes paralleling plural diameters of the roll extending crosswise of each other, said trough depressions having continuous trough walls formed of thermally fused-together contiguous edge portions immediately bordering on the trough depressions of all the mutually adjacent protruding cathode foil edges at said end, said protruding cathode foil edges being fused together only along the mutually touching edge portions bounding the trough depressions.

2. An electrolytic capacitor as defined in claim 1, wherein the trough depressions of thermally fused bounding cathode foil edges are arranged in a first group of elongated straight trough elements spanning the roll and paralleling a diametric axis thereof and a second group of straight trough elements spanning the roll and extending perpendicular to the trough elements of the first group.

3. An electrolytic capacitor comprising an outer metallic case, a top seal for said case having a pair of terminal members extending therethrough, a capacitor cartridge within said case in the form of a roll comprising a spirally wound set of layers of elongated alternately superposed metallic foil and dielectric strips, the metallic foil strips forming an anode foil of narrower width than the dielectric strips in insulated relation therebetween and a cathode foil positioned with one of its edges protruding in exposed relation beyond the corresponding edges of the dielectric sheets at one end of the roll, tab members secured to said anode foil and cathode foil and to said terminal members and said end of the roll having a pattern of rectilinear narrow width, elongated trough depressions therein formed in the protruding cathode foil edges of adjacent convoluted turns completly spanning said end along trough axes paralleling plural diameters of the roll extending crosswise of each other, said trough depressions having continuous trough walls formed of thermally fused-together contiguous edge portions immediately bordering on the trough depressions of all the mutually adjacent protruding cathode foil edges at said end, said protruding cathode foil edges being fused together only along the mutually touching edge portions bounding the trough depressions.

4. An electrolytic capacitor as defined in claim 3, wherein the trough depressions of thermally fused bounding cathode foil edges are arranged in a first group of elongated straight trough elements spanning the roll and paralleling a diametric axis thereof and a second group of straight trough elements spanning the roll and extending perpendicular to the trough elements of the first group.

* * * * *